United States Patent
Masutani et al.

(10) Patent No.: US 10,106,440 B2
(45) Date of Patent: Oct. 23, 2018

(54) MEMBRANE SEPARATION DEVICE

(71) Applicant: KUBOTA CORPORATION, Osaka-shi, Osaka (JP)

(72) Inventors: Hidetoshi Masutani, Amagasaki (JP); Yasunobu Okajima, Amagasaki (JP)

(73) Assignee: Kubota Corporation, Osaka (JP)

( * ) Notice: Subject to any disclaimer, the term of this patent is extended or adjusted under 35 U.S.C. 154(b) by 97 days.

(21) Appl. No.: 13/944,540

(22) Filed: Jul. 17, 2013

(65) Prior Publication Data
US 2013/0299413 A1  Nov. 14, 2013

Related U.S. Application Data

(63) Continuation of application No. PCT/JP2012/050905, filed on Jan. 18, 2012.

(30) Foreign Application Priority Data

Jan. 18, 2011 (JP) ................................. 2011-008131

(51) Int. Cl.
*C02F 1/44* (2006.01)
*B01D 63/08* (2006.01)
*B01D 65/08* (2006.01)

(52) U.S. Cl.
CPC .............. *C02F 1/44* (2013.01); *B01D 63/082* (2013.01); *B01D 65/08* (2013.01);
(Continued)

(58) Field of Classification Search
CPC ................................................. B01D 2315/06
See application file for complete search history.

(56) References Cited

U.S. PATENT DOCUMENTS

| 2005/0023219 A1* | 2/2005 | Kirker et al. ................. 210/636 |
| 2010/0000935 A1* | 1/2010 | Sakai et al. ................... 210/455 |
| 2012/0012514 A1 | 1/2012 | Sasakawa et al. |

FOREIGN PATENT DOCUMENTS

| EP | 2 260 926 | 12/2010 |
| JP | 11-057425 | 3/1999 |

(Continued)

OTHER PUBLICATIONS

Takahata et al., "Machine Translation of JP2009-233571", 2009, 25 total pages.*

(Continued)

*Primary Examiner* — Bobby Ramdhanie
*Assistant Examiner* — Jonathan M Peo
(74) *Attorney, Agent, or Firm* — Beyer Law Group LLP

(57) ABSTRACT

A membrane separation device is provided with membrane modules comprising multiple membrane elements, a frame body accommodating the membrane modules stacked in multiple stages, a stopper for closing an end portion of the frame body to prevent the membrane modules accommodated in the frame from being released, and elastic members which, arranged in a state of elastic deformation in the vertical direction in the frame with the end portion of the frame being closed, suppress vertical vibration of the membrane modules accommodated in the frame, whereby making it possible to avoid vibration of the membrane modules inside the frame body even if the volume of the membrane modules accommodated in the frame body varies.

2 Claims, 5 Drawing Sheets

(52) U.S. Cl.
CPC ...... *B01D 2313/02* (2013.01); *B01D 2313/20* (2013.01); *B01D 2313/21* (2013.01); *B01D 2315/06* (2013.01); *B01D 2321/185* (2013.01)

(56) References Cited

FOREIGN PATENT DOCUMENTS

| JP | 2003-019423 | 1/2003 | | |
|---|---|---|---|---|
| JP | 2008-068162 | 3/2008 | | |
| JP | 2009-233571 | 10/2009 | | |
| JP | WO 2009118785 A1 * | 10/2009 | ............. | B01D 61/18 |
| WO | WO 2009/118785 | 10/2009 | | |
| WO | 2010/098089 | 9/2010 | | |

OTHER PUBLICATIONS

Tanida et al., Machine Translation of JPH10137556, Published 1998, 6 total pages.*
Yoyoyama et al., "Machine Translation of JPS6467207", published 1989, 9 total pages.*
Uejima et al., "Machine Translation of JP2000271452", published 2000, 14 total pages.*
International Search Report in PCT/JP2012/050905 dated Apr. 24, 2012.
Supplementary Search Report dated Mar. 1, 2016 from EP Application No. 12736914.8.

* cited by examiner

MEMBRANE SEPARATION DEVICE

CLAIM OF PRIORITY

The present application is a Continuation of International Application No. PCT/JP2012/050905 filed on Jan. 18, 2012, which claims benefit of Japanese Patent Application No. 2011-008131 filed Jan. 18, 2011. The entire contents of each application noted above are hereby incorporated by reference.

BACKGROUND OF INVENTION

1. Field of Invention

The present invention relates to a membrane separation device using activated sludge process suitable for water treatment, such as sewage treatment and wastewater treatment.

2. Description of the Related Art

Conventionally, in sewage treatment and wastewater treatment employing the activated sludge process, a membrane separation device of submerge type is used for solid-liquid separation which is necessary in the treatment process.

International Patent Publication No. WO2009/118785 discloses a pair of liquid collection unit, a plurality of membrane elements which are arranged between the pair of liquid collection units, and a membrane module having such a structure that filtered liquid which has passed through the membrane elements is collected in the liquid collection units.

The membrane modules are stacked in multiple stages and connected to the liquid collection units which are arranged adjacent thereto in a vertical direction such that filtered liquid is flow through between the liquid collection units.

A frame body accommodating the stacked membrane modules having multiple stages is used in order to maintain the orientation and connection state of each of the membrane modules and integrally install the membrane modules when the stacked membrane modules having the multiple stages are submerged into a biological treatment tank and the like and solid-liquid separation operations are performed.

It is preferable that the membrane modules, including the liquid collection units, are made of a resin to reduce the weight, while the frame body is made of a metal in many cases so as to provide a sufficient strength so as to hold each of the membrane modules in a stable position when it is disposed and submerged in the biological treatment tank and the like, as well to allow the membrane modules accommodated in the frame body to be integrally submerged into or taken out from the biological treatment tank and the like. Accordingly, the membrane modules and the frame body are made of different materials having different thermal expansion coefficients, and thus it is necessary to set the size of the frame body considering the variations in the ambient temperature.

In addition, when such a membrane separation device is submerged into the biological treatment tank, the volume of the membrane modules made of resin might be increased by absorbing water in the tank, and thus it is also necessary to set the volume of the metal frame body considering the expansion of the volume of the membrane module in advance.

Furthermore, when such a membrane separation device is transported by loading in a bulk container and if such a container transportation occurs under tropical regions right on the equator, for example, the temperature inside the container rises significantly, thereby causing such a phenomenon in which resin casings constituting the liquid collection units of the membrane modules expand under a high temperature and then shrink into a size smaller than the original size when the temperature returns to a room temperature, whereby the volume of the membrane modules tends to become smaller than the volume of the metal frame body.

Therefore, it is possible to set the size of the frame body considering the shrinking effect as described above, by performing a so-called annealing such that the membrane modules are exposed to a high temperature environment in advance so as to remove the molding distortion of the resin casings and the like. However, it is not practical since the manufacturing cost would increase remarkably, if the manufacture process should include such a process for exposing all of the membrane modules to a high temperature environment.

In such a situation, if the membrane separation device in which the volume of the membrane modules stacked in multiple stages in a frame body is smaller than that of the frame body is submerged and disposed in a biological treatment tank, and then a filtering operation is performed by aeration using a diffuser device provided below the membrane separation device, the membrane modules vibrate in a vertical direction within the frame body due to a upward flow caused by the aeration. The resulting wear and tear would cause problems of a considerably shortened life of the membrane modules.

SUMMARY OF THE INVENTION

In the view of the problems as described above, an objective of the present invention is to provide a membrane separation device which can avoid vibration of the membrane modules inside the frame body even if the volume of the membrane modules accommodated in the frame body varies.

In order to achieve the above-mentioned objective, the first characteristic structure of the membrane separation device in accordance with one embodiment of the present invention is that it includes a plurality of membrane modules each including a plurality of membrane elements, a frame body accommodating the membrane modules by stacking the membrane modules in multiple stages, a closing member closing an end portion of the frame body so as to prevent the membrane modules accommodated in the frame body from being released, and an elastic member disposed in the frame body such that the elastic member is elastically deformed in a vertical direction in a state where the end portion of the frame body is closed.

Since the membrane modules stacked in multiple stages are accommodated in the frame body, and the elastic member is disposed in the frame body such that the elastic member is elastically deformed in a vertical direction when the end portion of the frame body is closed, even if the dimensions of the membrane modules of the multiple stages are made smaller in advance than the dimensions of the frame body, or the membrane modules shrink after manufacturing thereof, vibration of the membrane modules in the vertical direction within the frame body can be effectively suppressed by the elastic member, thereby making it possible to stably operate the membrane modules for a long period of time.

It should be noted that the elastic member is not limited to a specific material or shape so long as the elastic member can prevent vibration of the membrane modules in the vertical direction. For example, the elastic member can appropriately employ a spring made of a metal of plastic, an elastically deformable resin member or natural rubber member, and the like.

The second characteristic structure in accordance with one embodiment of the present invention is that the elastic member is disposed between the membrane modules, in addition to the first characteristic structure as described above.

According to the above-described structure, not only the vibration of the entire membrane modules inside the frame body is suppressed, but also abrasion caused between the membrane modules is reliably prevented by the elastic member even if a slight vibration occurs, thereby making it possible to stably operate all of the membrane modules for a long period of time.

The third characteristic structure in accordance with one embodiment of the present invention is that it is further provided with a coupling portion configured to couple and fix the adjacent membrane modules each other in the vertical direction, and a coupling margin of the coupling portion and a thickness of the elastic member are set such that a coupling state of the coupling portion is maintained regardless of an extent of elastic deformation of the elastic member, in addition to the second characteristic structure as described above.

The stacking position of the membrane modules stacked in the multiple stages in the frame body is stably maintained by the coupling portion configured to couple and fix the adjacent membrane modules each other in the vertical direction. Since the coupling margin of the coupling portion and the thickness of the elastic member are set such that the coupling state of the coupling portion is maintained regardless of the extent of the elastic deformation of the elastic member which is disposed between the membrane modules, it is possible to reliably avoid such an undesirable situation that the coupling of the coupling portion in the frame body releases and the stacking position of the membrane modules breaks. For example, even if each of the membrane modules shrinks and becomes smaller than its original dimensions under the certain circumstances as described above, it is possible to appropriately suppress the vibration, as well as reliably avoiding such an undesirable situation in which the stacked position of the membrane modules brakes. It is further preferable if the coupling margin of the coupling portion and the thickness of the elastic member are set such that the coupling state of the coupling portion is also maintained when the elastic member is in an uncompressed state without elastic deformation.

The fourth characteristic structure in accordance with one embodiment of the present invention is that each membrane module includes a plurality of membrane elements, each including a membrane support body in a form of a flat panel or sheet and a separation membrane arranged on a front surface and a rear surface of the support body, the plurality of membrane elements being arranged in a longitudinal position such that the separation membranes thereof face one another with a fixed distance provided therebetween; a liquid collection unit is provided in a traverse direction side portion of each of the membrane elements, where the liquid collection portion is configured to collect filtered liquid which has permeated from each of the membrane elements; the coupling portion includes an opening and an insertion portion, where the opening is in communication with the liquid collection unit of each of the adjacent membrane modules such that the filtered liquid flows therethrough, and the insertion portion is configured to engage with an inner wall of the opening and fit therein in a liquid-tight state; and a length of the insertion portion to maintain the liquid-tight state defines the coupling margin, in addition to any one of the above-mentioned first to third characteristic structures.

According to such structures described above, the stacked membrane modules are coupled to each other in the vertical direction by opposing surfaces of the liquid collection unit thereof so as to maintain the stacking position via the coupling portion, while the filtered liquid collected in each of the collection units can flow through the coupling portions which are coupled in the liquid-tight state. In addition, since the length of the insertion portion that maintains the liquid-tight state defines the coupling margin, the vibration is appropriately suppressed and the liquid-tight state is also appropriately maintained, even if each of the membrane modules shrinks and becomes smaller than its original dimensions under certain circumstances.

The fifth characteristic structure in accordance with one embodiment of the present invention is that the elastic member which is formed of a rubber sheet configured to elastically deform in a thickness direction thereof is disposed between opposing surfaces of the vertically adjacent membrane modules, where the elastic member includes convex portions having a thickness greater than the thickness of the elastic member or concave portions or holes having a thickness smaller than the thickness of the elastic member, in addition to any one of the above-mentioned second to fourth characteristic structures.

In order to place the elastic member having a sheet-like shape between the adjacent membrane modules and to maintain the elastic body in a elastically deformed state, it is necessary to press the membrane modules with a rather large force, and thus it is necessary for the closing member which closes the frame body and the end portion of thereof to have a sufficient strength. This may limit the degree of freedom in designing the frame body, and a required thickness of the rubber sheet may disadvantageously increase the material cost thereof. However, by employing the structures described above, the rubber sheet which is provided with the thicker convex portions or the thinner concave portions or hole portions elastically and partially deforms between the opposing surfaces of the vertically adjacent membrane modules so as to suppress the vibration, and thus the required pressing force onto the membrane modules to suppress the vibration can be reduced without extremely increasing the strength of the closing member which closes the frame body and the end portion thereof, as well as the material cost for the rubber sheet can be reduced.

As described above, according to the present invention, it became possible to provide a membrane separation device in which vibration of the membrane modules in the frame body can be avoided even when the volume of the membrane modules accommodated in the frame body varies.

DESCRIPTION OF EMBODIMENTS OF THE PRESENT INVENTION

Figure 1:
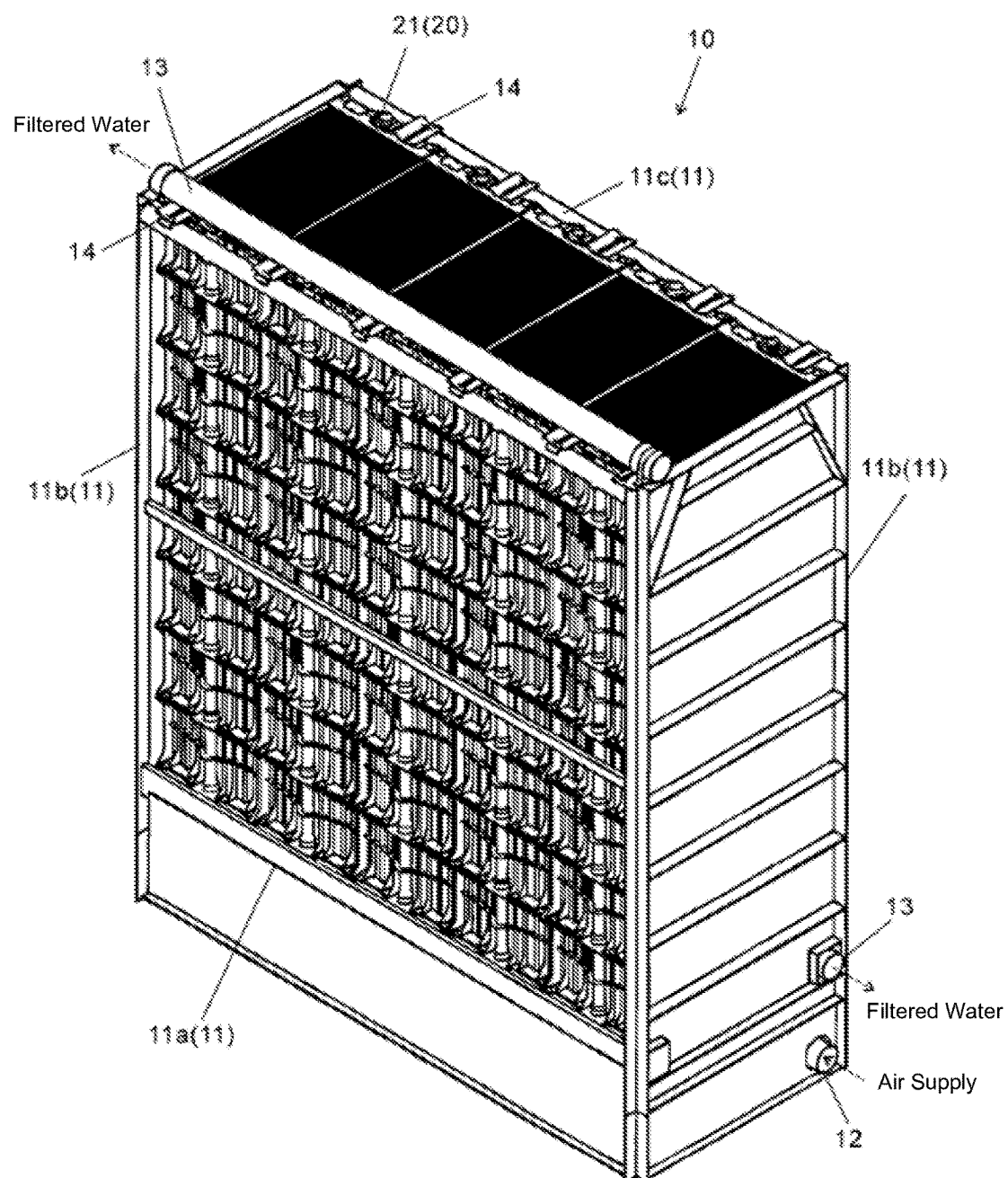
FIG. 1 is a diagram explaining a membrane separation device.
Figure 2:
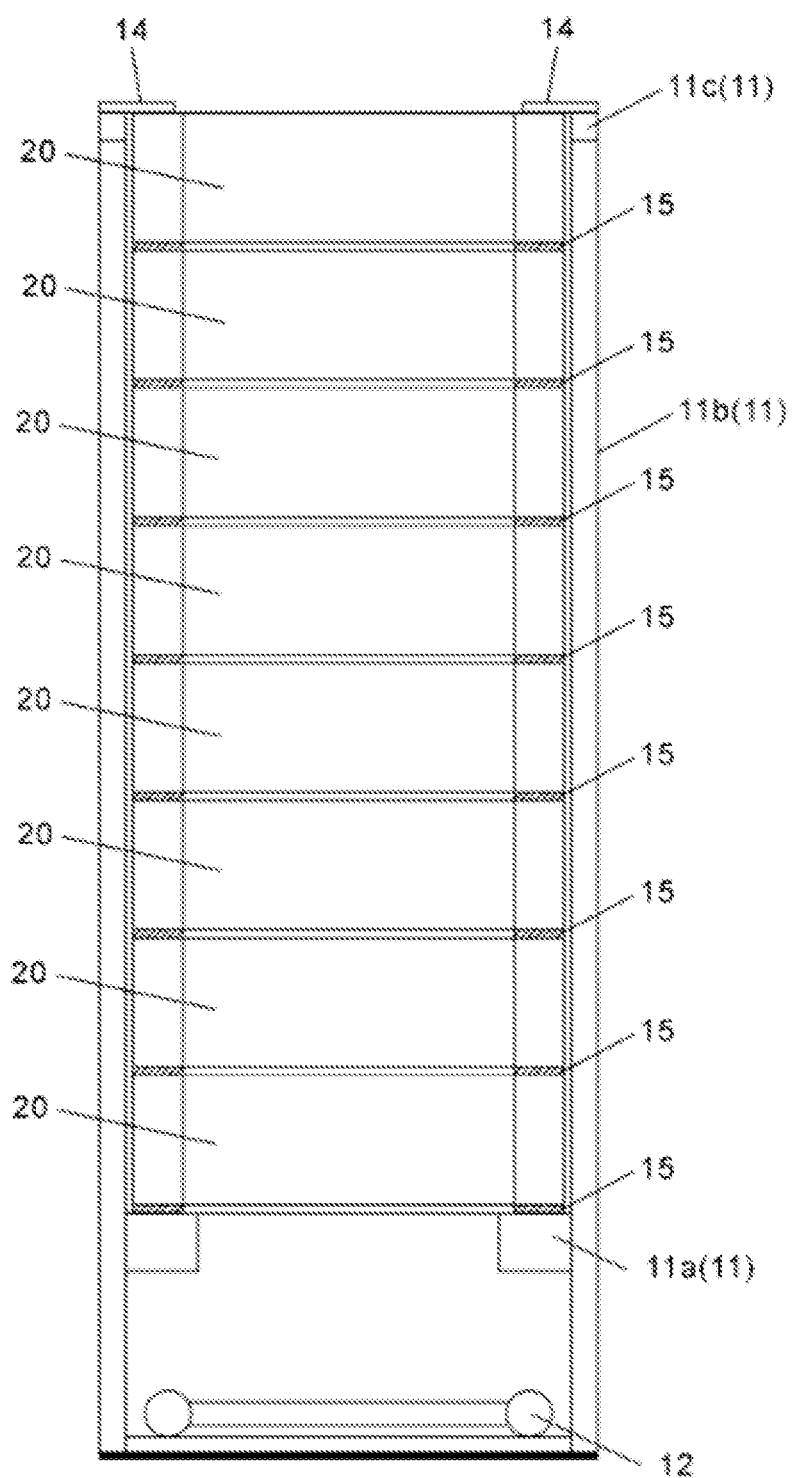
FIG. 2 is a schematic diagram of the membrane separation device.

Hereafter, the membrane separation device in accordance with the present invention is described. As shown in FIG. 1 and FIG. 2, a membrane separation device 10 includes five rows of membrane module groups laterally arranged in a frame body 11 and submerged into liquid to be treated in a biological treatment tank, where membrane modules 20 are longitudinally arranged to form an eight-stage stack in each membrane module group.

The frame body 11 is formed of a metal and includes a lower frame 11, a side frame 11b, an upper frame 11c, and the like, since it is necessary for the frame body 11 to have a sufficient strength such that each of the membrane modules 20 is held in a stable position when the membrane modules 20 are arranged and submerged in the biological treatment tank, as well as the membrane modules 20 accommodated therein are integrally submerged into or taken out of the biological treatment tank.

The membrane modules 20 are made of a resin and the like. Because the volume of the membrane modules 20 will increase by absorbing water in the biological treatment tank, the frame body 11 is manufactured to have dimensions that take into account the expansion of the volume of the membrane modules 20.

A diffuser air supply pipe 12 is provided under the membrane module 20 at the bottom of the stack in the biological treatment tank, and diffusion air supplied by the diffuser air supply pipe 20 causes an upward flow of the liquid to be treated between a plurality of membrane elements 21 which are in a longitudinal position and laterally arranged in a horizontal direction in each of the membrane module 20. The treated liquid which has been filtered through the membrane surface of each membrane element 21 is led to the outside of the tank via a liquid collection pipe 13.

The liquid collection pipe 13 is in communication with a treated liquid delivery pipe (not shown) which leads to a treated liquid tank which is disposed outside the biological treatment tank, and a pumping apparatus is installed in a middle of the pipeline. The diffuser air supply pipe 12 is in communication with an air supply source such as a blower or a compressor.

The upper frame 11c is provided with a stopper (closing member) 14 which closes an upper end portion of the frame body 11 such that the membrane module groups accommodated therein are not released from the upper end portion of the frame body 11. The stopper 14 is made of a metal similar to the frame 11 and formed in a flat plate shape, and is fastened with bolts to the upper frame 11c which is disposed on the front and rear sides of each top-stage membrane module 20 of each of the membrane module groups which are laterally arranged in five rows.

An elastic member 15 is disposed between the membrane modules 20 which are stacked in the frame body 11. The top-stage membrane modules 20 is pressed with a large force by the stopper 14, and the elastic body 15 arranged between the membrane modules 20 is in an elastically deformed state, that is, in this case, in a compressed state, thereby suppressing vibration in a vertical direction of the membrane modules 20 accommodated in the frame body 11 due to the upward flow caused by aeration of the diffuser device 12.

Figure 3A:
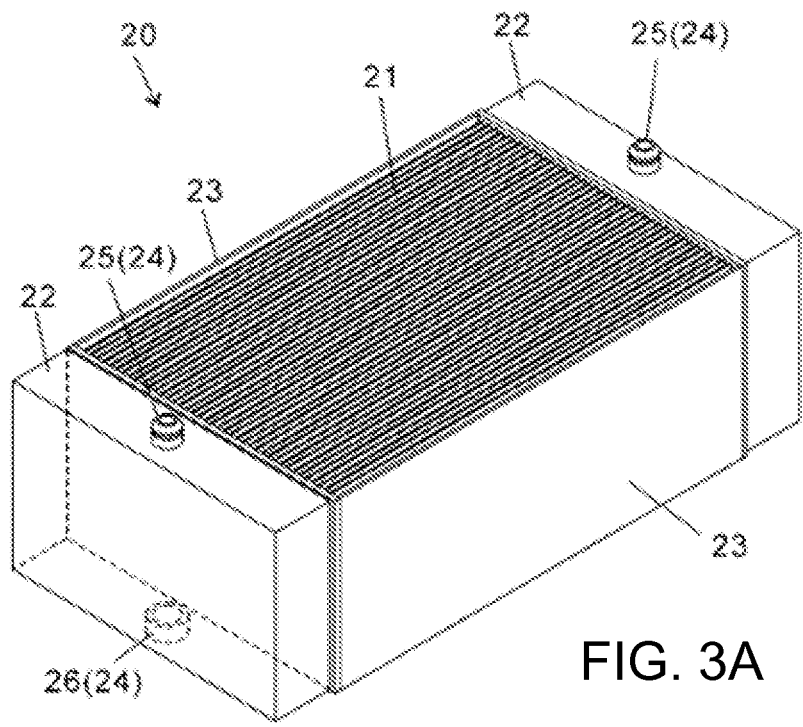
FIG. 3A is a diagram explaining a membrane module.

The membrane modules 20 are explained below. As shown in FIG. 3A, each membrane module 20 includes a pair of front and rear liquid collection units 22, a pair of right and left cover members 23, and a plurality of membrane elements 21. The plurality of membrane elements 21 are arranged in a longitudinal position with a fixed distance therebetween and disposed in a space defined by the pair of front and rear liquid collection units 22 and the pair of right and left cover members 23 such that membrane surfaces are facing one another.

Figure 3B:
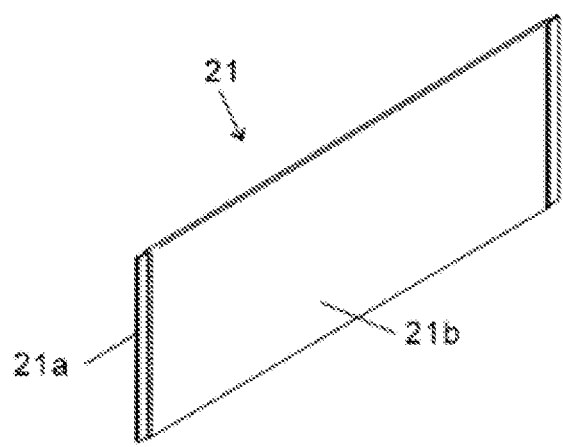
FIG. 3B is a diagram explaining a membrane element.

As shown in FIG. 3B, each membrane element 21 is formed of a filter plate 21a in a form of a flat panel as a membrane support body, and a separation membrane 21b, where the separation membrane 21b is disposed on both sides of the filer plate 21a.

The liquid collection unit 22 is hollowed out such that the treated liquid which has been filtered through the separation membrane 21b is guided to the inside of the liquid collection unit 22 through liquid collection passages formed in the filter plate 21a.

A filter plate 21a is formed of ABS resin and the like, and the separation membrane 21b is formed by applying and impregnating a porous resin into a non-woven fabric as a base material. The filter plate 21a is not limited to a rigid material such as ABS resin, but may be formed using a flexible material such as a sheet-shaped non-woven fabric or a net.

The collection units 22 and the cover members 23 are obtained by injection molding of ABS resin, polypropylene, or the like. It is preferable that the collection units 22 are made of a transparent or translucent material such that it may be easy to check if the sludge flows into the collection units 22 due to damages to the separation membrane 21b and the like.

Each of the liquid collection units 22 has a coupling portion 24 provided between and connecting and fixing the membrane modules 20 which are adjacent in the vertical direction.

The coupling portion 24 includes an opening 26 which is in communication with the respective liquid collection units 22 of the vertically adjacent membrane modules 20 such that the filtered liquid flows therethrough between the liquid collection units 22, and an insertion portion 25 which is engaged with an inner wall of the opening 26 and fitted therein in a liquid-tight state.

Figure 4:
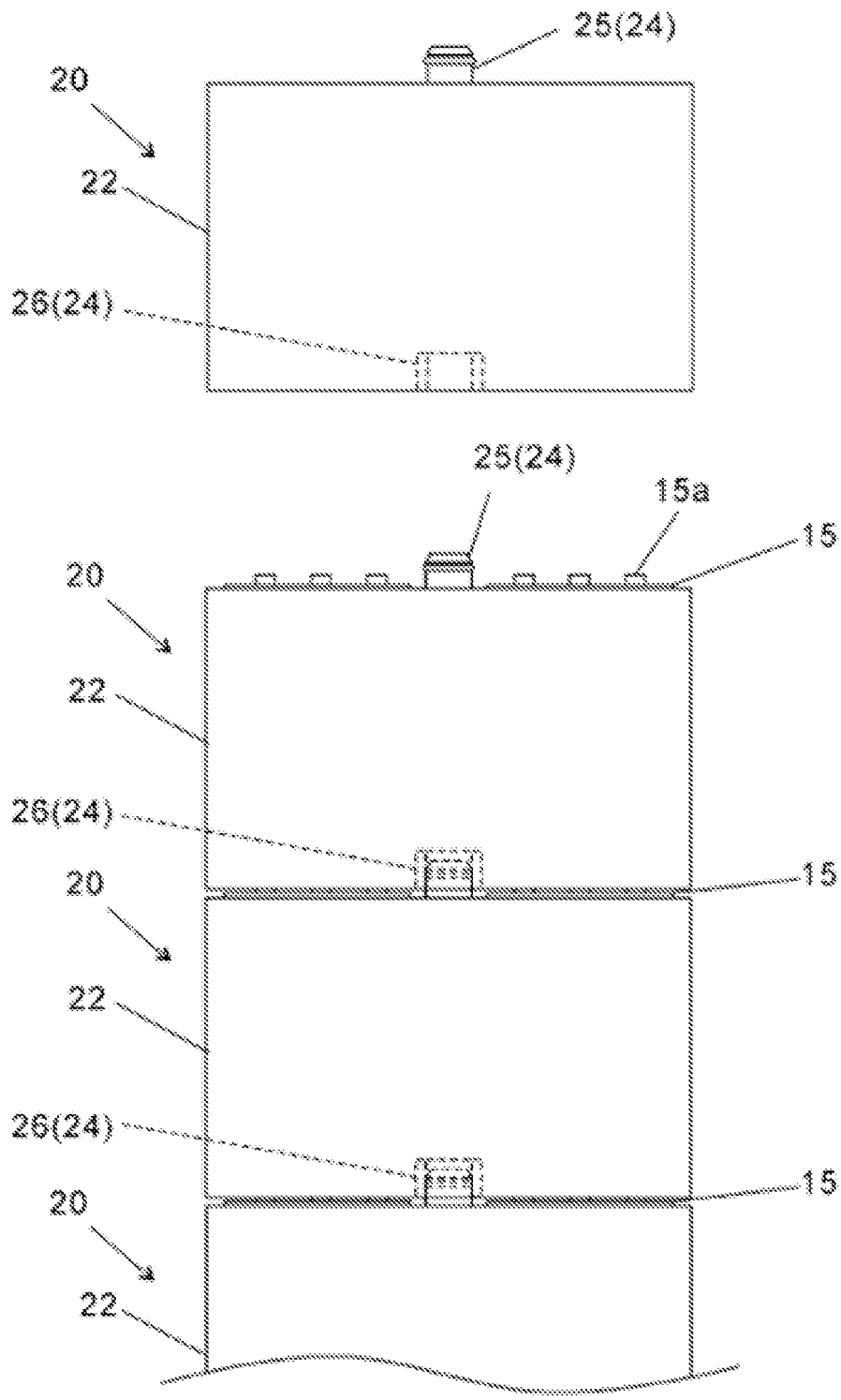
FIG. 4 is a diagram explaining a stack of the membrane modules.

As shown in FIG. 4, the insertion portion 25 is liquid-tightly engaged with the opening 26 which is formed in the liquid collection unit 22 of the membrane module 20 stacked immediately thereabove, thereby providing communication between the adjacent liquid collection units 22 in the vertical direction. Consequently, the membrane modules 20 stacked inside the frame body 11 are coupled to one another at respective opposite surfaces of the corresponding liquid collection units 22 adjacent in the vertical direction and stably held in their position via the coupling portions 24, while the filtered liquid which is collected from the membrane element 21 of each membrane module 20 into the collection unit 22 is allowed to flow through the coupling portions 24 which are coupled in a liquid-tight state. The filtered liquid passing through the coupling portions 24 is led out to the collection pipe 13 which is disposed in the vicinity of the upper frame 11c and inside the lower frame 11a.

Figure 3C:
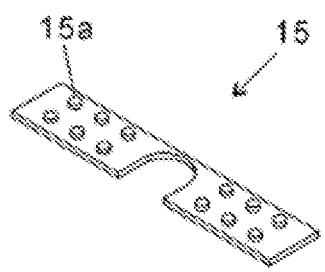
FIG. 3C is a schematic diagram of an elastic member.

The elastic member 15 is explained below. As shown in FIG. 3C, the elastic member 15 is formed of a rubber sheet which is elastically deformable in a thickness direction thereof and formed to have a size similar to that of an upper surface of the liquid collection unit 22.

Convex portions 15a which have a thickness greater than that of the rubber sheet are formed on the surface of the rubber sheet in a dispersed manner, and a cut-out portion having a U-shape is formed in a center portion of the rubber sheet such that the insertion portion 25 is inserted therein when the rubber sheet is disposed between the opposing surfaces of the liquid collection units 22 of the membrane modules 20 adjacent in the vertical direction.

The elastic member 15 is disposed between the opposing surfaces of the liquid collection unit 22 of the membrane modules 20 adjacent in the vertical direction. The coupling margin of the coupling portion 24 and the thickness of the elastic member 15 are set such that the insertion portion 25 remains inserted in the opening 26 in a liquid-tight state such that the coupling state of the coupling portion 24 is maintained regardless of the extent of the elastic deformation of the elastic member 15.

Figure 5A:
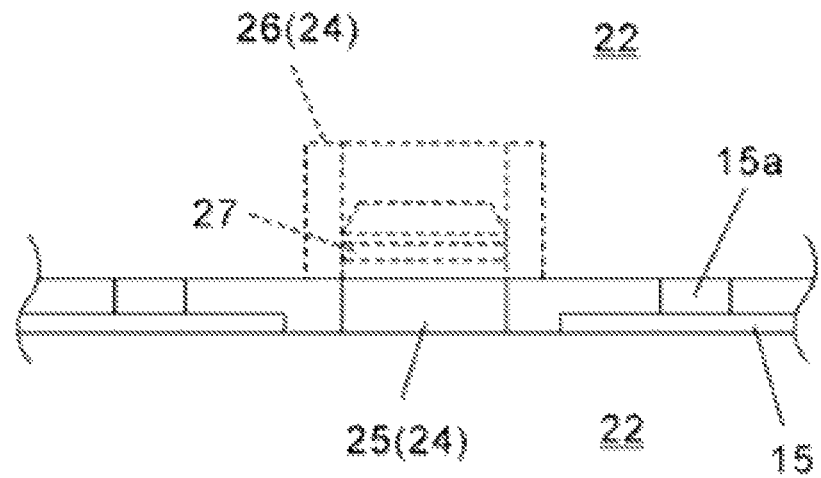
FIG. 5A is a diagram explaining an elastically deformed (compressed) state of the elastic member disposed between the membrane modules.
Figure 5B:
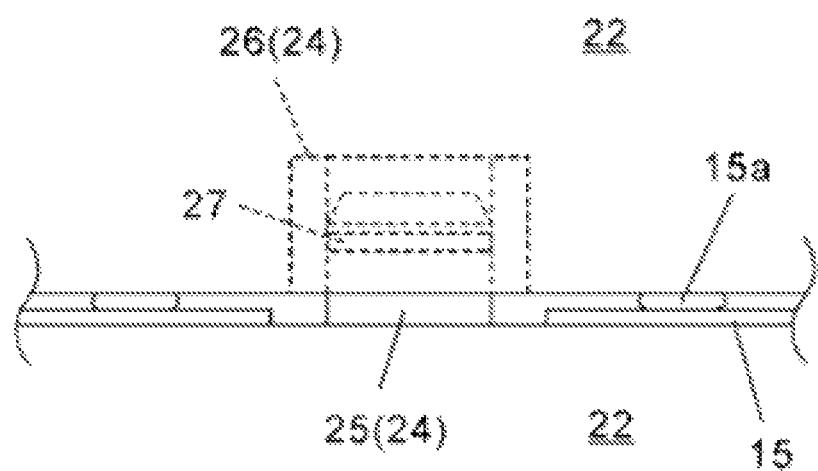
FIG. 5B is a diagram explaining the elastic member in an uncompressed state.

For example, the coupling margin of the coupling portion 24 and the thickness of the elastic member 15 are set such that the insertion portion 25 remains inserted in the opening 26 in a liquid-tight state such that the coupling state of the coupling portion 24 is maintained, whether the stopper 14 is fastened with the bolts so as to press the top-stage membrane module 20 with a large force such that the elastic member 15 is in an elastically deformed state as shown in FIG. 5A, or the elastic member 15 is in a non-compressed state without elastic deformation, as shown in FIG. 5B, as the total height of the eight stacked membrane modules 20 becomes too smaller than the accommodation height of the frame body 11 due to the shrinking of the membrane modules such that tightening the bolts cannot make the stopper 14 press the top membrane module 20 with a sufficiently large force.

In addition, a packing such as an O-shaped ring 27 is disposed on an outer periphery of the insertion portion 25 such that the packing is in pressure contact with the inner peripheral surface of the opening 26. However, the structure to form the liquid-tight state is not limited to this specific structure.

The coupling margin of the coupling portion 24 is defined by the length of the insertion portion 25 to maintain the liquid-tight state even when the elastic member 15 is in a non-compressed state, and the thickness of the elastic member 15 is defined by the weight of the membrane module 20, the material and dimensions of the rubber sheet, the number and size of the convex portions 15a, and the like.

The elastic member 15 may have, instead of the convex portions 15a formed on the surface of the rubber sheet, concave portions or holes which have a thickness smaller than the thickness of the rubber sheet and formed on the rubber sheet in a distributed manner. In addition, it is possible to form convex portions, concave portions, and holes in combination.

Furthermore, the elastic member 15 may be formed of, instead of a rubber sheet, a plurality of cylindrical rubber members corresponding to the convex portions 15a which are arranged in a distributed manner.

In order to place the elastic member 15 having a sheet-like shape between the adjacent membrane modules 20 and to maintain the elastic member 15 in a elastically deformed state, it is necessary to press the membrane modules 20 with a rather large force, and thus it is necessary for the stopper 14 which closes the frame body 11 and the end portion thereof to have a sufficient strength. This may limit the degree of freedom in designing the frame body 11, and the required thickness of the rubber sheet may disadvantageously increase the material cost.

However, the rubber sheet which is provided with the thicker convex portions or the thinner concave portions or holes formed thereon in a distributed manner partially and elastically deforms between the opposing surfaces of the membrane modules 20 adjacent in the vertical direction so as to suppress the vibration, and thus it is possible to reduce the required pressing force onto the membrane modules 20 to suppress the vibration without extremely increasing the strength of the stopper 14 which closes the frame body and the end portion thereof, while the material cost for the rubber sheet can also be reduced.

As described above, since the elastic member 15 is disposed, in an elastically deformed state, between the membrane modules 20 which are stacked in a state in which the upper end portion of the frame body 11 is closed by the stopper 14, even if the height of the group of the membrane modules is formed in advance to be smaller than the accommodation height from the lower frame 11a to the stopper 14 provided on the upper frame 11c, or even if the membrane modules shrink after manufacturing thereof, the vibration in the vertical direction of the membrane modules 20 within the frame body member 11 is effectively suppressed by the elastic member 15 such that the membrane modules 20 can be stably operated for a long pried of time.

Furthermore, not only the vibration of the entire membrane modules 20 inside the frame body 11 is suppressed, but also, if a slight vibration occurs, abrasion caused between the membrane modules 20 is reliably prevented by providing the elastic member 15 between the membrane modules 20, and thus it possible to stably operate all of the membrane modules 20 for a long period of time.

Furthermore, when the membrane separation device is transported by loading in a bulk container and the like, more specifically, when such container transportation occurs in tropical regions right on the equator, for example, the temperature inside the container rises significantly, thereby causing such a phenomenon in which the membrane modules 20 constituting the liquid collection units of the membrane modules expand under such a high temperature, and then shrink into a size smaller than the original size when the temperature returns to a room temperature, resulting in a smaller volume than the volume of the metal frame body. Even in such a case, vibration of the membrane modules 20 is properly suppressed during operation of the membrane separation device 10 so as to reliably avoid an undesirable situation such as collapsing of the stacking position of the membrane modules 20 due to release of the coupling state of the coupling portions 24 inside the frame body 11.

The membrane separation device according to another embodiment of the present invention is described below. In the embodiment described above, the elastic member 15 is made of a rubber sheet in a flat plate shape and disposed between the membrane modules 20. However, the shape and the location of the elastic member are not limited to these. For example, an elastic member of a block shape may be disposed between the top-stage membrane module 20 and the stopper 14, or between the bottom-stage membrane module 20 and the lower frame 11a. Any structure can be used so long as it can prevent vibrations of the membrane modules 20 within the frame body 11 during the operation of the membrane separation device.

In addition, the elastic member is not limited to a specific material or shape so long as it can prevent vibration of the membrane modules in the vertical direction, and may be a spring such as a coil spring made of a resin or metal or a leaf spring. The elastic member may also employ other elastically deformable materials such as synthetic rubber or natural rubber.

Each embodiment described above is an example of the present invention, and thus the present invention is not limited by the description. A design of the specific structure of each part is appropriately changed so long as the function and effects of the present invention can be achieved.

What is claimed is:
1. A membrane separation device comprising:
a plurality of membrane modules;
a frame body accommodating the plurality of membrane modules by stacking the membrane modules in multiple stages in a vertical direction; and
a closing member closing an end portion of the frame body so as to prevent the membrane modules accommodated in the frame body from being released,
wherein each of the plurality of membrane modules includes:
a plurality of membrane elements, each including:
a membrane support body in a form of a flat panel or sheet; and
a separation membrane provided on a front surface and a rear surface of the membrane support body, the plurality of membrane elements being arranged in a longitudinal position such that the separation membranes thereof face one another with a fixed distance provided therebetween;
a pair of liquid collection units provided on both sides of the plurality of membrane elements so as to collect filtered liquid permeated from the plurality of membrane elements therebetween, each liquid collection unit having an upper horizontal surface and a lower horizontal surface; and
a coupling portion provided on the upper and lower horizontal surfaces of each of the liquid collection units, the coupling portion being configured to liquid-tightly couple with another coupling portion of another liquid collection unit adjacent thereto in the vertical direction such that the membrane modules adjacent in the vertical direction are fixed to each other, the coupling portion including:
an opening that allows the filtered liquid to flow therethrough so as to provide a fluid communication between the vertically adjacent liquid collection units; and
an insertion portion, an outer wall thereof being configured to be engaged with an inner wall of a corresponding opening of the vertically adjacent liquid collection unit so as to be fitted therein in a liquid-tight manner, a length of the insertion portion to maintain a liquid-tight coupling state of the coupling portion defining a coupling margin,
and wherein the membrane separation device further comprises:
an elastic member disposed between and extending along opposing upper and lower horizontal surfaces of vertically adjacent liquid collection units such that the elastic member substantially covers the opposing upper and lower horizontal surfaces while avoiding the coupling portion, the elastic member being formed in a sheet shape having an U-shaped cutout such that the coupling portion is disposed in the U-shaped cutout, and the elastic member being elastically deformed in a compressed state in the vertical direction when the end portion of the frame body is closed, wherein the coupling margin of the coupling portion and a thickness of the elastic member in the vertical direction being set such that the liquid-tight coupling state of the coupling portion is maintained regardless of an extent of the elastic deformation of the elastic member, whereby the elastic member suppresses a vibration of the membrane modules in a state where the end portion of the frame body is closed.
2. The membrane separation device of claim 1,
wherein the elastic member is formed of a rubber sheet configured to elastically deform in a thickness direction thereof, the elastic member including:
convex portions provided on a surface of the rubber sheet, the convex portions having a thickness in the thickness direction greater than an original thickness of the rubber sheet, or concave portions or holes provided on the surface of the rubber sheet, the concave portions or holes having a thickness in the thickness direction smaller than the original thickness of the rubber sheet.

* * * * *